June 14, 1949.   C. R. CRANE, II ET AL   2,473,013
VALVE ACTUATING MECHANISM

Filed Jan. 22, 1944   2 Sheets-Sheet 1

Inventors:
Charles R. Crane II &
Alfred Mueller:
By Joseph O. Lange, Atty

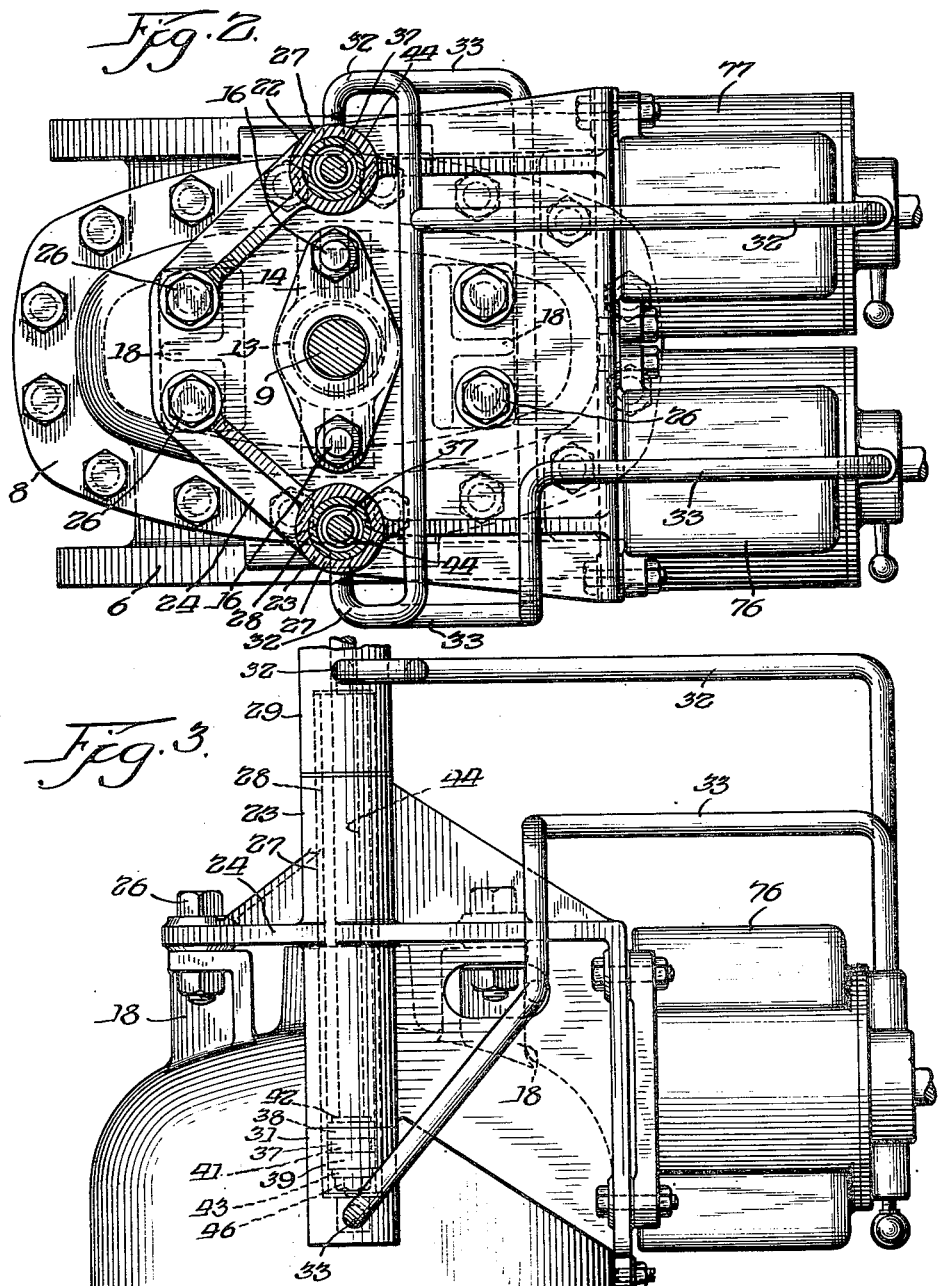

Patented June 14, 1949

2,473,013

UNITED STATES PATENT OFFICE 2,473,013

VALVE ACTUATING MECHANISM

Charles R. Crane, II, Chicago, and Alfred Mueller, Berwyn, Ill., assignors to Crane Co., Chicago, Ill., a corporation of Illinois Application January 22, 1944, Serial No. 519,387

5 Claims. (Cl. 137—139)

This invention relates to valve actuating mechanism or the like and is more particularly concerned with improvements in combined hydraulic and mechanically operable means for actuating a valve closure member, and has for an object the provision of hydraulic operating means which may readily be incorporated in a standard valve structure in place of the usual yoke arms and without otherwise changing the original design. While various forms of combined hydraulic and mechanically operable means have heretofore been applied to or incorporated in valves for operating the closure members thereof, their particular constructions and arrangements of parts merely provide makeshift attachments for standard valves or else have necessitated radical and uneconomical changes in present valve design and without embodying resultant improvements therein.

Briefly, this improved valve actuating structure comprises in combination a valve of the outside screw and yoke type having the usual yoke sleeve for threaded operating engagement with a closure stem. In place of the usual pair of yoke arms for engagement with the yoke sleeve a pair of cylinders is provided which are secured to the yoke arm pads of a valve bonnet to receive piston members for effecting reciprocable movement. A yoke sleeve bearing member is provided to receive the yoke sleeve for rotational movement therein and is connected at its ends to the outer ends of the piston members. A reciprocating movement of the pistons thus acts through the bearing member, yoke sleeve and closure stem to move the closure member towards either its open or closed position.

In the mechanical operation of the valve the yoke sleeve bearing member is bolted to the cylinders to prevent vertical movement of same and a handwheel, or other means either manually or power actuated, is employed to rotate the yoke sleeve for raising or lowering the stem and the closure member attached thereto.

This invention further contemplates the provision of improved means for holding the stem and closure member in open or raised position after the valve has been operated by the hydraulic means.

It is a further object of this invention to provide in a standard valve structure a hydraulically operated valve closure means which is relatively simple in operation, inexpensive in construction and which will not readily get out of order.

This invention embodies other novel features, details of construction and arrangement of parts which are hereinafter set forth in the specification and claims and illustrated in the accompanying drawings, forming part thereof, wherein:

Fig. 2 is a sectional view taken substantially on the line 2—2 of Fig. 1.

Fig. 3 is a fragmentary detail view in side elevation showing the construction of the hydraulic cylinder bracket and the means employed for securing same to a valve bonnet.

Figure 1:
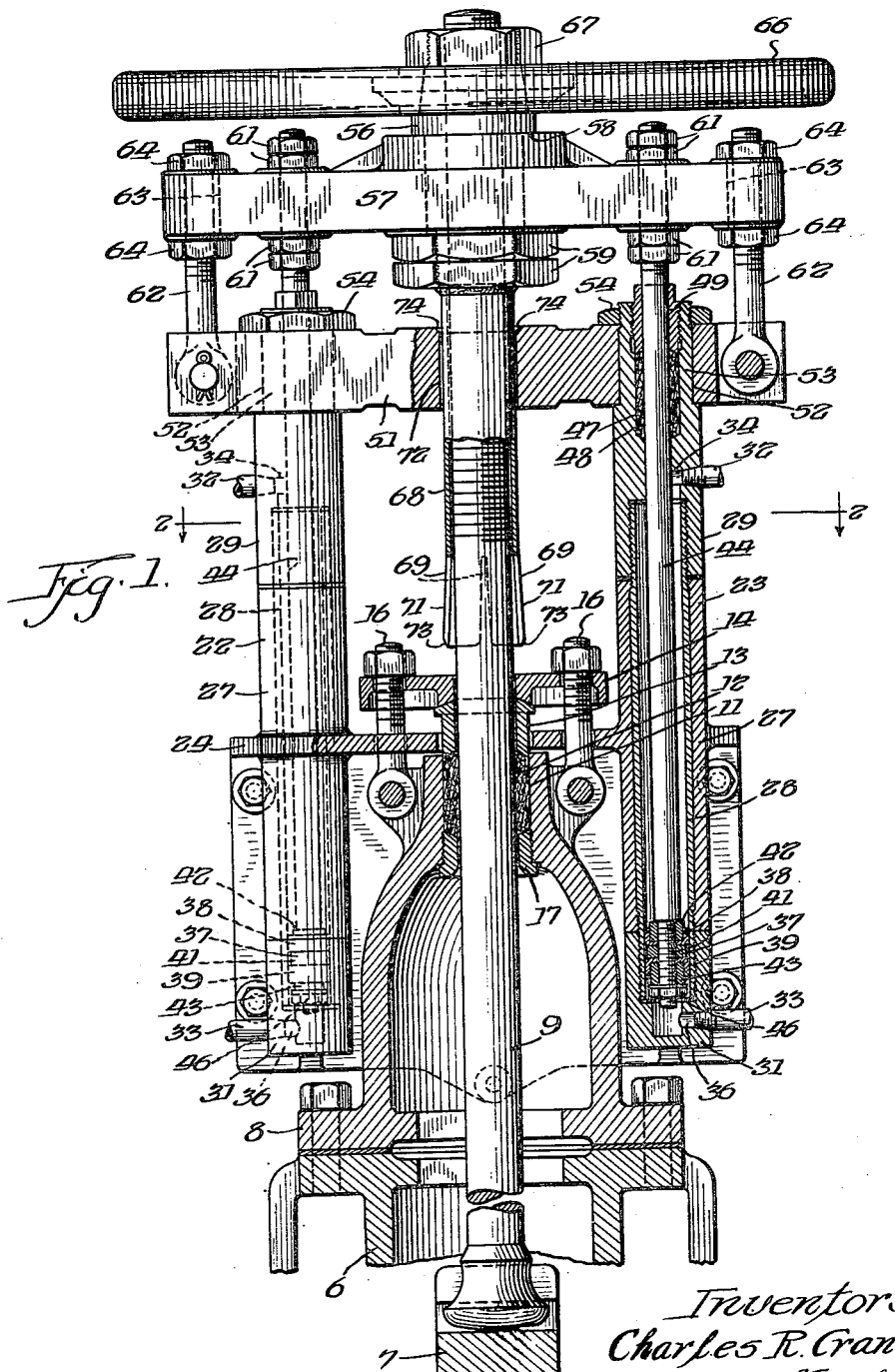
Fig. 1 is a fragmentary vertical sectional view showing a rising stem gate valve embodying features of this invention.

Referring now to the drawings for a better understanding of this invention, a valve structure is shown comprising a valve body 6 having a closure member 7 and a bonnet 8. A closure stem 9 engages the closure member 7 and projects through a stuffing box 11 filled with the usual packing 12. The stuffing box embodies the conventional packing gland 13, gland flange 14, gland flange bolts 16, and repacking seat bushing 17.

The bonnet is shown formed with the usual yoke arm pads 18. A pair of similar cylinders 22 and 23 are disposed on opposite sides of the bonnet and are joined by a flange portion 24 which is secured to the pads 18 by the bolts 26. Each cylinder preferably comprises a body portion 27 having a sleeve liner 28 mounted therein and is externally threaded on each end for threaded engagement with a top end member 29 and a bottom end member 31. Conduits 32 and 33 are threaded into fluid passageways 34 and 36, respectively, provided in the end members 29 and 31, respectively. Each cylinder is provided with a piston 37 embodying a pair of opposing cup washers 38 and 39, a spacer 41, and cup-forming discs 42 and 43 for attachment to the threaded end of a connecting rod 44 by means of a nut 46. The outer end of the connecting rod 44 projects through a stuffing box 47 provided in the top end member 29. The stuffing box is filled with suitable packing 48 and internally threaded to receive an externally threaded packing gland 49. The upper ends of the cylinders 22 and 23 are connected by means of a cross bar 51 having apertures 52 to receive the reduced end portions 53 of the top members 29. Nuts 54 are threaded onto the outer ends of the top members 29 to secure the cross bar 51 in position.

A yoke sleeve 56 is journaled in a yoke sleeve bearing member 57 for threaded engagement with the stem 9 and is held against axial movement relative to said bearing member by means of a shoulder 58 and nuts 59. The bearing member 57 is mounted on the outer ends of the piston rods 44 and is secured thereon by means of nuts 61. Eye bolts 62 are pivotally mounted on the ends of the cross bar 51 for detachable engagement in slots 63 formed in the ends of the bearing member 57 and are secured in locking position therewith by means of nuts 64. A handwheel 66 is secured to the yoke sleeve by a nut 67. A tubular stop member 68 is secured to the lower end of the yoke sleeve, as by welding or other suitable attaching means, and has its lower end formed with longitudinally extending slots 69 to provide the resilient fingers 71. When the valve is closed the stop member 68 is disposed as shown in Fig. 1; and when the valve is in full open position the stop member is disposed above the cross bar 51 to permit a radial movement of the ends of the fingers 71 to thereby position the tapered shoulders 73 on the fingers above the tapered shoulder 74 leading into the aperture 72.

In the mechanical operation of the valve, the sleeve bearing member 57 is held against vertical movement by means of the eye bolts 62 and the handwheel 66 is turned to move the stem 9 axially through the yoke sleeve 56 in accordance with the usual valve operation.

In the hydraulic operation of the valve the eye bolts 62 must be disengaged from the sleeve bearing member 57 to permit vertical movement of the piston members. In opening the valve hydraulically, fluid under pressure is directed from a pump 76 through conduits 33 and passages 36 to the lower ends of the cylinders 22 and 23 to force the pistons 37 toward the upper ends of the cylinders, thereby acting through the piston rods 44, sleeve bearing member 57, yoke sleeve 56 and stem 9 to actuate the closure member 7. The stop member 68 is provided to hold the parts in raised position in the event of fluid leakage from the lower end of the cylinder. In closing the valve hydraulically, fluid under pressure is directed from pump 77 into the upper ends of the cylinders through conduits 32 and passages 34 to move the pistons 37 toward the lower ends of the cylinders, and at the same time to force the resilient fingers 71 downwardly through the aperture 72.

While a plurality of pumps 76 and 77 has been illustrated and described, it is clear that a single pump element provided with a suitable four-way valve may be employed with equally satisfactory results.

It will thus be seen that the type of hydraulic valve operating means described may readily be applied to a conventional form of manually operated or other form of power operated valve by merely positioning the same in place of the usual yoke arms.

While this invention has been shown in but one embodiment it is obvious to those skilled in the art that it is not so limited but is susceptible of various changes and modifications without departing from the spirit thereof or the appended claims.

We claim:

1. In a valve, the combination with a valve bonnet having a closure stem reciprocably mounted therein for operating a closure member, of a yoke sleeve for threaded engagement with said stem, a pair of cylinders secured to said bonnet, piston means for reciprocating movement in said cylinders, a crosshead connecting the said cylinders, a yoke sleeve bearing member mounted on said piston means and engaging the yoke sleeve for relative rotational movement, means inhibiting relative axial movement, and stop means cooperating with said crosshead and stem for yieldably resisting movement of the piston means in one direction.

2. In a valve, the combination with a valve bonnet having a closure stem reciprocably mounted therein for operating a closure member, of a yoke sleeve for threaded engagement with said stem, a pair of cylinders secured to said bonnet, piston means for reciprocating movement in said cylinders, a yoke sleeve bearing member mounted on said piston means and engaging the yoke sleeve for relative rotational movement, means inhibiting relative axial movement, means for holding the yoke sleeve bearing member in locked engagement with said cylinders, and mechanical means for rotating the yoke sleeve for imparting axial movement to the closure stem for operating the closure member, while the said locking means holds the said yoke sleeve bearing member against axial movement.

3. In a valve, the combination with a valve bonnet having a closure stem reciprocably movable therewithin for effecting similar movement of a closure member, of a yoke sleeve for threaded engagement with said stem, a pair of cylinders secured to said bonnet, piston means for reciprocating movement in said cylinders, a yoke sleeve bearing member mounted on said piston means and engaging the yoke sleeve for relative rotational movement, means inhibiting relative axial movement, each of said cylinders comprising a body portion, a liner inserted in the body portion, end portions defining the ends of the liner and engaging the body portion, fluid passages formed in the end portions, and pump means secured to said cylinders for supplying fluid under pressure to said fluid passages formed in said end portions.

4. In a valve, the combination with a valve bonnet having a closure stem reciprocably movable therewithin for effecting similar movement of the closure member, of a yoke sleeve for threaded engagement with said stem, a pair of cylinders secured to said bonnet, piston means for reciprocating movement in said cylinders, a yoke sleeve bearing member mounted on said piston means and engaging the yoke sleeve for relative rotational movement, means inhibiting relative axial movement, each of said cylinders comprising a body portion, a crosshead connecting the said body portions and having means thereon by which the axial movement of the said yoke sleeve bearing member can be prevented, a liner inserted in the body portions, end portions defining the ends of the liner and engaging the body portions, fluid passages formed in the end portions, and pump means secured to said cylinders for supplying fluid under pressure to the said fluid passages formed in the said end portions.

5. In a valve, the combination with a valve bonnet having a closure stem reciprocably movable therewithin for effecting similar movement of the closure member, of a yoke sleeve for threaded engagement with said stem, a pair of cylinders secured to said bonnet, piston means for reciprocating movement in said cylinders, a yoke sleeve bearing member mounted on said piston means and engaging the yoke sleeve for relative rotational movement and restricted relative axial movement, each of said cylinders comprising a body portion, an angular plate member connecting the said body portion of each cylinder, the said plate member being apertured to provide for the projection therethrough of the said closure stem, a liner inserted in the body portion, end portions defining the ends of the liner and engaging the body portion, fluid passages formed in the end portions, and pump means secured to said cylinders for supplying fluid under pressure to the said fluid passages formed in the said end portions, the said angular plate member serving as a support for the said pump means.

CHARLES R. CRANE, II.
ALFRED MUELLER.

REFERENCES CITED

The following references are of record in the file of this patent:

UNITED STATES PATENTS

| Number | Name | Date |
|---|---|---|
| 335,112 | DeKinder | Feb. 2, 1886 |
| 1,872,762 | Laurencich | Aug. 23, 1932 |
| 1,927,366 | Hall | Sept. 19, 1933 |
| 1,950,854 | Lerch | Mar. 13, 1934 |
| 1,977,554 | Hall | Oct. 16, 1934 |
| 2,012,003 | Hall | Aug. 20, 1935 |
| 2,320,930 | Hooper | June 1, 1943 |
| 2,356,899 | Stutter | Aug. 29, 1944 |
| 2,363,605 | McLintock | Nov. 28, 1944 |